US012094410B2

(12) United States Patent
Fan et al.

(10) Patent No.: US 12,094,410 B2
(45) Date of Patent: Sep. 17, 2024

(54) DRIVING VOLTAGE COMPENSATION CIRCUIT, DRIVING CIRCUIT, PIXEL DRIVING CIRCUIT AND DISPLAY DEVICE

(71) Applicants: MIANYANG HKC OPTOELECTRONICS TECHNOLOGY CO., LTD., Sichuan (CN); HKC CORPORATION LIMITED, Shenzhen (CN)

(72) Inventors: Tao Fan, Mianyang (CN); Baohong Kang, Mianyang (CN)

(73) Assignees: MIANYANG HKC OPTOELECTRONICS TECHNOLOGY CO., LTD., Mianyang (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/078,362

(22) Filed: Dec. 9, 2022

(65) Prior Publication Data

US 2023/0245621 A1 Aug. 3, 2023

(30) Foreign Application Priority Data

Jan. 28, 2022 (CN) ......................... 202210105094.3

(51) Int. Cl.
*G09G 3/3233* (2016.01)

(52) U.S. Cl.
CPC ..... *G09G 3/3233* (2013.01); *G09G 2300/043* (2013.01); *G09G 2300/0819* (2013.01);
(Continued)

(58) Field of Classification Search
None
See application file for complete search history.

(56) References Cited

U.S. PATENT DOCUMENTS

2012/0098877 A1* 4/2012 Taro ..................... G09G 3/3225 345/691
2014/0085284 A1* 3/2014 Sun ...................... G09G 3/3266 345/76

(Continued)

FOREIGN PATENT DOCUMENTS

CN 103208255 A 7/2013
CN 104123908 A 10/2014

(Continued)

OTHER PUBLICATIONS

Search Report issued on Mar. 14, 2023, in corresponding International Application No. PCT/CN2022/141039, 8 pages.

(Continued)

*Primary Examiner* — Dorothy Harris
(74) *Attorney, Agent, or Firm* — Maier & Maier, PLLC

(57) ABSTRACT

A driving voltage compensation circuit including a compensation circuit and a first switching circuit, the first switching circuit connects a driving element and a light emitting device, and the compensation circuit is connected to the driving element. The circuit operates according to an operational timing, the operational timing including a plurality of cycles, each cycle including at least a first time period and a second time period; during the first time period of each of the plurality of cycles, the first switching circuit is turned on, and the compensation circuit is turned off; the energy storage element releases electrical energy to provide a driving voltage to the driving element; during the second time period, the compensation circuit utilizes the received data voltage to store electrical energy for the energy storage element of the compensation circuit.

17 Claims, 5 Drawing Sheets

(52) U.S. Cl.
CPC ............... *G09G 2300/0842* (2013.01); *G09G 2310/08* (2013.01); *G09G 2320/0233* (2013.01); *G09G 2330/028* (2013.01)

(56) References Cited

U.S. PATENT DOCUMENTS

| | | | | |
|---|---|---|---|---|
| 2014/0168180 | A1* | 6/2014 | Kim | H05B 45/60 345/205 |
| 2014/0320550 | A1* | 10/2014 | Liao | G09G 3/3225 345/82 |
| 2015/0221255 | A1* | 8/2015 | Qing | G06F 3/0412 345/212 |
| 2016/0217741 | A1* | 7/2016 | Tseng | G09G 3/3275 |
| 2016/0372049 | A1* | 12/2016 | Wang | G09G 3/3283 |
| 2018/0137808 | A1* | 5/2018 | Na | G09G 3/3233 |
| 2018/0301093 | A1* | 10/2018 | Li | G09G 3/3233 |
| 2019/0005888 | A1* | 1/2019 | Kim | G09G 3/3233 |
| 2019/0019452 | A1 | 1/2019 | Zhu et al. | |
| 2021/0201828 | A1* | 7/2021 | Jung | G09G 3/3696 |
| 2022/0335880 | A1* | 10/2022 | Zheng | G09G 3/3233 |

FOREIGN PATENT DOCUMENTS

| | | | |
|---|---|---|---|
| CN | 104464630 | A | 3/2015 |
| CN | 108877648 | A | 11/2018 |
| CN | 109872682 | A | 6/2019 |
| CN | 111599309 | A | 8/2020 |
| CN | 113870785 | A | 12/2021 |
| WO | WO-2020191872 | A1 * | 10/2020 |

OTHER PUBLICATIONS

Office Action issued on Feb. 8, 2023, in corresponding Chinese Application No. 202210105094.3, 14 pages.

* cited by examiner

DRIVING VOLTAGE COMPENSATION CIRCUIT, DRIVING CIRCUIT, PIXEL DRIVING CIRCUIT AND DISPLAY DEVICE

CROSS-REFERENCE TO RELATED APPLICATIONS

This application claims priority to Chinese Patent Application No. 202210105094.3 filed on Jan. 28, 2022, the contents of which are incorporated herein by reference.

TECHNICAL FIELD

The present application relates to the technical field of display technology, in particularly to a driving voltage compensation circuit, a driving circuit, a pixel driving circuit, and a display device.

BACKGROUND

Active-Matrix Organic Light-Emitting Diode (AMOLED) has been rated as one of the most potential display technologies in the industry due to its advantages of self-illumination, low power consumption, wide visual view, high color gamut, high contrast, and rapid response. Organic Light-Emitting Diode (OLED), also known as OLED light emitting device, which its brightness mainly depends on the size of its driving current, the greater the current, the greater the brightness, so the OLED device has very high requirements on the stability of the driving device. At present, the most suitable for OLED Driven Thin Film Transistor (TFT) technology is Low Temperature Poly-Silicon (LTPS) TFT technology, which has the advantages of high stability and high carrier mobility. However, in the traditional pixel driving circuit, affected by its own characteristics, such as the threshold voltage, the brightness of the display device will be uneven, affecting the performance of the whole display device.

SUMMARY

The present application provides a driving voltage compensation circuit, a driving circuit, a pixel driving circuit, and a display device for reducing influence of a power supply voltage and a threshold voltage of a driving element on a drive current supplied by the driving element to a light-emitting device.

The described technical solutions are as follows:

A first aspect provides a driving voltage compensation circuit, including: a compensation circuit and a first switching circuit, wherein the first switching circuit is connected to a first pole of a driving element and a light emitting device, the compensation circuit is configured to connect to a third pole of the driving element, a second pole of the driving element is connected to a power supply, the first switching circuit and the light emitting device are grounded;

the driving voltage compensation circuit operates in accordance with an operational timing including a plurality of cycles, each of the plurality of cycles includes at least a first time period and a second time period; during the first time period of each of the plurality of cycles, the first switching circuit is turned on, and the compensation circuit is turned off; during the second time period of each of the plurality of cycles, the first switching circuit is turned off, and the compensation circuit is turned on; the first time period is a time period during which the light emitting device is driven to emit light, and the second time period is a time period during which a data voltage is received;

in the case where the compensation circuit is turned on, the compensation circuit is configured to store electrical energy for the energy storage element of the compensation circuit utilizing the received data voltage;

in the case where the compensation circuit is turned off, the energy storage element is configured to release the electrical energy to provide the driving voltage to the third pole of the driving element, the driving voltage is determined by a voltage of the power supply, a threshold voltage of the driving element, and the data voltage.

In the driving voltage compensation circuit provided in the present application, since the first switching circuit in the driving voltage compensation circuit is turned on and the compensation circuit is turned off during the first time period of each cycle, since the first switching circuit connects the first pole of the driving element and the light emitting device, and thus, during the first time period, the first switching circuit is turned on to provide the driving current to the light emitting device, i.e., to drive the light emitting device to emit light. In the second period of each cycle, the first switching circuit is turned off and the compensation circuit is turned on, in which case the first switching circuit is turned off indicating that the path between the light emitting device and the driving element is turned off, and in which case the compensation circuit is turned on, the compensation circuit stores electrical energy for the energy storage element of the compensation circuit utilizing the received data voltage, the voltage of the energy storage element is determined by the voltage of the power supply, the threshold voltage of the driving element, and the data voltage. In the case where the compensation circuit is turned off, the compensation circuit is configured to release the electrical power to provide a driving voltage to the third pole of the driving element. That is, the energy storage element stores energy prior to the first time period of each cycle, and in the first time period, the stored energy is released by the energy storage element to provide the driving voltage to the driving element. Since the factors in addition to the driving element itself which affects the driving current provided by the driving element to the light emitting device include: the supply voltage, the threshold voltage of the driving element, and the driving voltage of the driving element, and the values of the supply voltage, the threshold voltage of the driving element, and the data voltage are determined, so that the present application can compensate for the influence of the supply voltage and the threshold voltage of the driving element on the driving current.

Optionally, the compensation circuit is further configured to receive a first scan signal, the first switching circuit is configured to receive a second scan signal, the first scan signal is configured to control the on/off of the compensation circuit, and the second scan signal is configured to control the on/off of the first switching circuit.

Optionally, during the first time period of each of the plurality of cycles, the compensation circuit does not receive the data voltage, the first scan signal is a first level signal, the second scan signal is a second level signal, and level states of the first level signal and the second level signal are opposite; and during the second time period of each of the cycles, the first scan signal is the second level signal, the second scan signal is the first level signal, and the compensation circuit receives the data voltage.

Optionally, the compensation circuit further includes a second switching circuit for receiving the first scan signal, one end of the second switching circuit is configured to receive the data voltage, the other end of the second switching circuit is connected to one end of the energy storage element, in the case where the second switching circuit is opened, the energy storage element is configured to store the electrical energy utilizing the received data voltage; and in the case where the second switching circuit is turned off, the energy storage element is configured to release the electrical energy.

Optionally, the second switching circuit includes a plurality of switching devices, and the plurality of switching devices include a first switching device and a second switching device;

wherein a second pole of the first switching device is configured to receive the data voltage, and a first pole of the first switching device is respectively connected to the first switching circuit and a first end of the energy storage element; and a third pole of the first switching device is connected to the first scanning signal and a third pole of the second switching device, and a second end of the energy storage element is respectively connected to a second pole of the second switching device and a third pole of the driving element.

Optionally, the first switching circuit includes a plurality of switching devices, and the plurality of switching devices include a third switching device and a fourth switching device; wherein a second pole of the third switching device is connected to the compensation circuit, a third pole of the third switching device is connected to a third pole of the fourth switching device and the second scan signal, a second pole of the fourth switching device is connected to the compensation circuit and a first pole of the driving element, a first pole of the fourth switching device is connected to the light emitting device.

Optionally, the switching device is a P-type field-effect transistor.

In a second aspect, an embodiment of the present application provides a driving circuit including a driving element and the driving voltage compensation circuit mentioned above, a first pole of the driving element is connected to the first switching circuit, a third pole of the driving element is connected to the compensation circuit, and a second pole of the driving element is configured to connect to a power supply.

Optionally, the driving element is a drive-type transistor, a drain of the drive-type transistor is connected to the power supply, a gate of the drive-type transistor is connected to the second end of the energy storage element in the compensation circuit, and a source of the drive-type transistor is connected to the compensation circuit.

Optionally, the driving current provided by the driving circuit to the light emitting device during the first time period is determined by the data voltage, a carrier mobility, a channel width and a channel length of the drive element, and a first parameter; and the first parameter is determined by a gate insulation layer thickness and material of the drive element.

In a third aspect, an embodiment of the present application provides a driving voltage compensation method applied to a driving voltage compensation circuit including: a compensation circuit and a first switching circuit, wherein the first switching circuit is connected to a first pole of a driving element and a light emitting device, the compensation circuit is connected to a third pole of the driving element, a second pole of the driving element is connected to a power supply, and the first switching circuit and the light emitting device are grounded;

the driving voltage compensation circuit operates in accordance with an operational timing including a plurality of cycles, each of the plurality of cycles includes at least a first time period and a second time period; during the first time period of each of the plurality of cycles, the first switching circuit is turned on, and the compensation circuit is turned off; during the second time period of each of the plurality of cycles, the first switching circuit is turned off, and the compensation circuit is turned on; the first time period is a time period during which the light emitting device is driven to emit light, and the second time period is a time period during which a data voltage is received;

in the case where the compensation circuit is turned on, the compensation circuit is configured to store electrical energy for the energy storage element of the compensation circuit utilizing the received data voltage. In the case where the compensation circuit is turned off, the compensation circuit is configured to release the electrical power to provide a driving voltage to a third pole of the driving element.

In one possible embodiment of the present application, the method provided by the embodiment of the present application further includes: the compensation circuit is configured to receive a first scan signal, the first switching circuit is configured to receive a second scan signal, the first scan signal is configured to control an on/off of the compensation circuit, and the second scan signal is configured to control an on/off of the first switching circuit; and accordingly, the compensation circuit is turned on or turned off according to a state of the received data voltage and the first scan signal.

In one possible embodiment of the present application, during the first time period of each of the plurality of cycles, the compensation circuit does not receive the data voltage, the first scan signal is a first level signal, the second scan signal is a second level signal, and level states of the first level signal and the second level signal are opposite; and during the second time period of each of the cycles, the first scan signal is the second level signal, the second scan signal is the first level signal, and the compensation circuit receives the data voltage.

In one possible embodiment of the present application, the method provided by the embodiment of the present application further includes: the compensation circuit further receives a second switching circuit of the first scan signal, and in the case where the second switching circuit is turned on, the energy storage element stores the electrical energy utilizing the received data voltage;

in the case where the second switching circuit is turned off, the energy storage element releases the electrical energy.

In one possible embodiment of the present application, a second switching circuit includes: a first switching device and a second switching device; wherein a second pole of the first switching device is configured to receive the data voltage, and a first pole of the first switching device is respectively connected to the first switching circuit and a first end of the energy storage element; and a third pole of the first switching device is connected to the first scanning signal and a third pole of the second switching device, and a second end of the energy storage element is respectively connected to a second pole of the second switching device and a third pole of the driving element.

In one possible embodiment of the present application, a first switching circuit includes: a third switching device and a fourth switching device; wherein a second pole of the third switching device is connected to the compensation circuit, a third pole of the third switching device is connected to a third pole of the fourth switching device and the second scan signal, a second pole of the fourth switching device is connected to the compensation circuit and a first pole of the driving element, a first pole of the fourth switching device is connected to the light emitting device.

A fourth aspect provides a pixel driving circuit including: a data line and a plurality of scanning lines, and the driving circuit mentioned above, the data line is configured to provide the data voltage to the pixel driving circuit, and the plurality of scanning lines are configured to control the pixel driving circuit.

A fifth aspect provides a display apparatus including the pixel driving circuit mentioned above.

It can be understood that the beneficial effects of the above-mentioned the second aspect, the third aspect, the fourth aspect, and the fifth aspect can refer to the description in the above-mentioned first aspect and will not be repeated herein.

BRIEF DESCRIPTION OF THE DRAWINGS

In order to more clearly illustrate the technical solutions in the embodiments of the present application, the drawings used in the embodiments or the prior art description will be briefly described hereinbelow. Obviously, the drawings in the following description are only some embodiments of the present application. Other drawings may be obtained from those having ordinary skill in the art without departing from the scope of the present application.

DETAILED DESCRIPTION OF THE EMBODIMENTS

In order to make the objectives, technical solutions, and advantages of the present application clearer, the embodiments of the present application will be further described in detail below with reference to the accompanying drawings.

It should be understood that the "a plurality of" referred to in this application means two or more. In the description herein, unless otherwise indicated, "/" means "or" meaning, e.g., A/B can mean A or B; "and/or" as used herein is merely one association describing an associated object means that there can be three associations, e.g., A and/or B, and can mean: A alone, A and B together, and B alone. In addition, to clearly describe the solutions in the embodiments, terms such as "first" and "second" are used in the embodiments to distinguish between same items or similar items that have basically the same functions or purposes. A person of ordinary skill in the art may understand that the terms such as "first" and "second" do not limit a quantity or an execution sequence, and the terms such as "first" and "second" do not mean being definitely different either.

Before explaining the embodiments of the present application in detail, the application scenarios of the embodiments of the present invention will be described.

Figure 1:
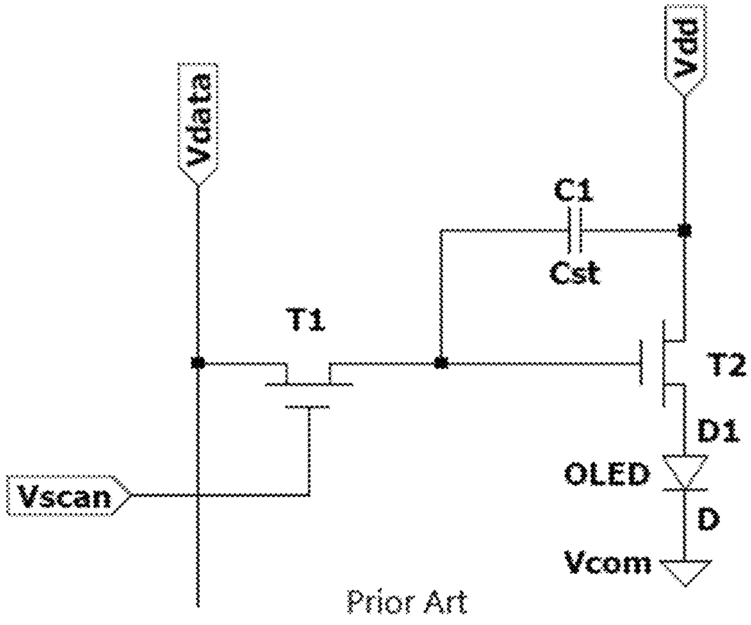
FIG. 1 is a schematic diagram of an OLED pixel driving device provided by the embodiment of the present application.

A general OLED pixel driving circuit is composed of two transistors, one storage capacitor and a light emitting device, as shown in FIG. 1, where the scanning line is configured to control the switch of the transistor T1, and another transistor T2 is configured to drive the light emitting device, and the capacitor is the storage capacitor for maintaining the drive-type transistor on. The factors affecting the driving current and light emitting luminance of the OLED devices are the carrier mobility, threshold voltage, power supply voltage and data voltage $V_{data}$, where the carrier mobility and threshold voltage are the key parameters to evaluate the performance of TFT devices. In practice, the threshold voltage has a homogeneity problem and will drift with the increase of operating time, resulting in uneven brightness of the display panel. In addition, the power supply line itself has a certain degree of internal resistance, so the actual power supply voltage transmitted to the OLED device is smaller than the actual voltage, and the power supply voltage and pressure drop is also the reason for the uneven brightness of the OLED display device.

For this purpose, the driving voltage compensation circuit, the driving circuit, the pixel driving circuit, and the display device are provided in the embodiment of present application, the drive voltage compensation circuit compensates for the threshold voltage drift and the supply voltage drop, and reduces the influence of the threshold voltage and the supply voltage on the driving current.

The driving voltage compensation circuit, driving circuit, pixel driving circuit and display device provided in the present application embodiment are explained in detail below.

Figure 2:
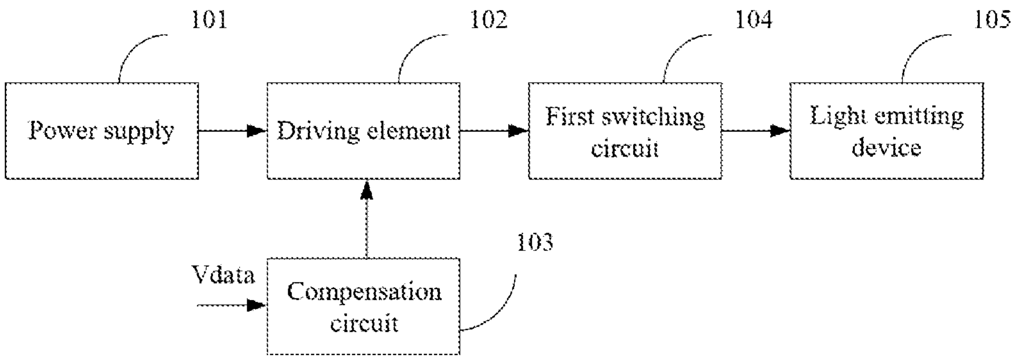
FIG. 2 is a schematic diagram of a driving voltage compensation circuit provided by the embodiment of the present application.

As shown in FIG. 2, FIG. 2 provides a driving voltage compensation circuit, including: a compensation circuit 103 and a first switching circuit 104. The first switching circuit 104 is connected to the first pole of the driving element 102 and the light emitting device 105. The compensation circuit 103 is connected to the third pole of the driving element 102. The second pole of the driving element 102 is connected to the power supply 101. The first switching circuit 104 and the light emitting device 105 are grounded. During the first time period of each of the cycles, the first switching circuit 104 is turned on, and the compensation circuit 103 is turned off. During the second time period of each of the cycles, the first switching circuit 104 is turned off, and the compensation circuit 103 is turned on. In the case where the compensation circuit 103 is turned on, the compensation circuit 103 is configured to store electrical energy for the energy storage element of the compensation circuit 103 utilizing the received data voltage $V_{data}$. The voltage of the energy storage element is determined by the voltage of the power supply 101, the threshold voltage $V_{th}$ of the driving element 102, and the data voltage $V_{data}$. In the case where the compensation circuit 103 is turned off, the energy storage element is configured to release the electrical energy to provide the driving voltage to the third pole of the driving element 102. The driving voltage is determined by the voltage of the power supply 101, the threshold voltage $V_{th}$ of the driving element 102, and the data voltage $V_{data}$.

The cycle is the timing of the driving voltage compensation circuit operating, and each cycle is divided into multiple time periods. The first time period is a light emitting phase or driving phase of the driving voltage compensation circuit, in which the first switching circuit 104 is turned on, and the driving element 102 sends a driving current to the light emitting device 105, so that the light emitting device 105 is in an operating state. The second time period is a compensation stage, in which the first switching circuit 104 is turned off, the compensation circuit 103 is turned on, and the compensation circuit 103 receives the data voltage to store the electrical energy for the energy storage element. Threshold voltage $V_{th}$ is the inherent characteristics of the driving element 102, and a drift occurs as the operating time of the driving element 102 increases.

In the driving voltage compensation circuit provided in the present application, since the first switching circuit in the driving voltage compensation circuit is turned on and the compensation circuit is turned off during the first time period of each cycle, since the first switching circuit is configured to connect the first pole of the driving element and the light emitting device, and thus, during the first time period, the first switching circuit is turned on to provide the driving current to the light emitting device, i.e., to drive the light emitting device to emit light. In the second period of each cycle, the first switching circuit is turned off and the compensation circuit is turned on, in which case the first switching circuit is turned off indicating that the path between the light emitting device and the driving element is turned off, and in which case the compensation circuit is turned on, the compensation circuit is configured to store electrical energy for the energy storage element of the compensation circuit utilizing the received data voltage, the voltage of the energy storage element is determined by the voltage of the power supply, the threshold voltage of the driving element, and the value of the data voltage. In the case where the compensation circuit is turned off, the compensation circuit is configured to release the electrical power to provide a driving voltage to the third pole of the driving element. That is, the energy storage element stores energy prior to the first time period of each cycle, and in the first time period, the stored energy is released by the energy storage element to provide the driving voltage to the driving element. Since the factors in addition to the driving element itself which affects the driving current provided by the driving element to the light emitting device include: the supply voltage, the threshold voltage of the driving element, and the driving voltage of the driving element, and the values of the supply voltage, the threshold voltage of the driving element, and the data voltage are determined, so that the present application can compensate for the influence of the supply voltage and the threshold voltage of the driving element on the driving current.

Figure 3:
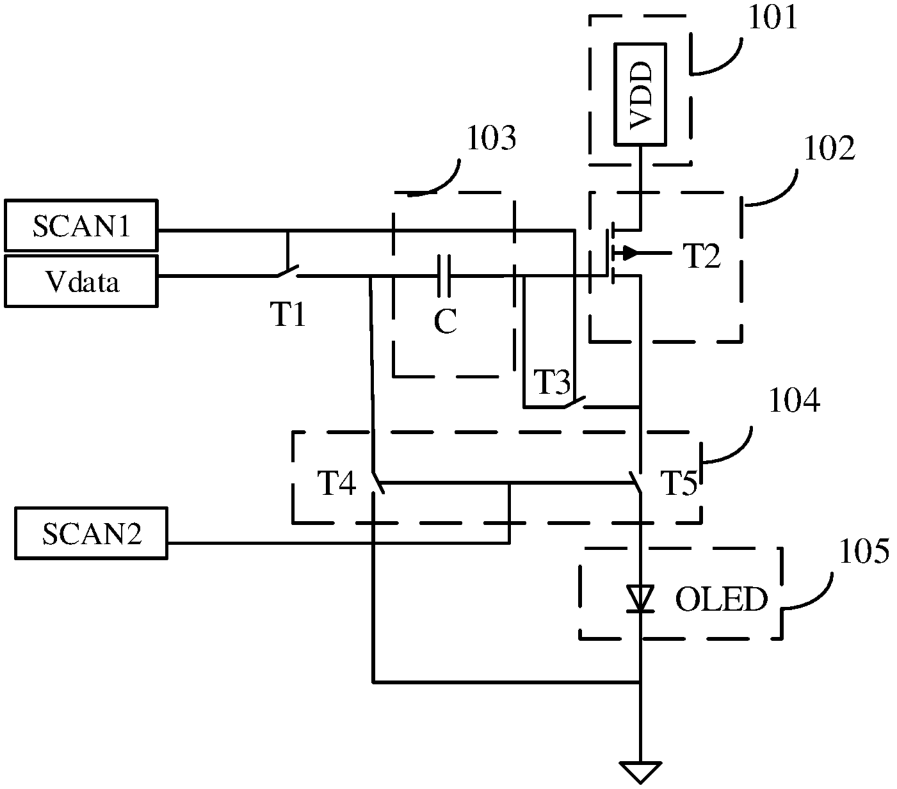
FIG. 3 is a schematic diagram of a driving voltage compensation circuit provided by the embodiment of the present application.

In one embodiment of the present application, as shown in FIG. 3, the storage element in the compensation circuit 103 is storage capacitor C, and the driving element 102 is drive-type transistor T2. The light emitting device 105 is an OLED. The first pole of the driving element 102 is the source (S pole) of the drive-type transistor T2, the second pole is the drain (D pole) of the drive-type transistor T2, and the third pole is the gate (G pole) of the drive-type transistor T2. Thus, one end of the storage capacitor C is connected to the gate of the drive-type transistor T2, the drain of the drive-type transistor T2 is connected to the power supply $V_{DD}$, and the first switch circuit 104 is connected to the source of the drive-type transistor T2 and the light emitting device OLED.

During the second time period of each cycle, the first switching circuit 104 is turned off and the compensation circuit 103 is turned on, and it can be understood that: the circuit between the drive-type transistor T2 and the light emitting device OLED is turned off. Since the compensation circuit 103 is turned on and the compensation circuit 103 is used to receive the data voltage, the compensation circuit 103 is connected to the drive-type transistor T2, and the circuit between the drive-type transistor T2 and the light emitting device OLED is turned off, so that one end of the energy storage element is equivalent to receiving the data voltage, and the other end of the energy storage element is equivalent to being connected to the power supply through the drive-type transistor T2, so the energy storage element has a voltage difference, and the compensation circuit 103 can use the received data voltage to store electrical energy for the energy storage element. In other words, the energy storage element begins to charge.

Figure 5:
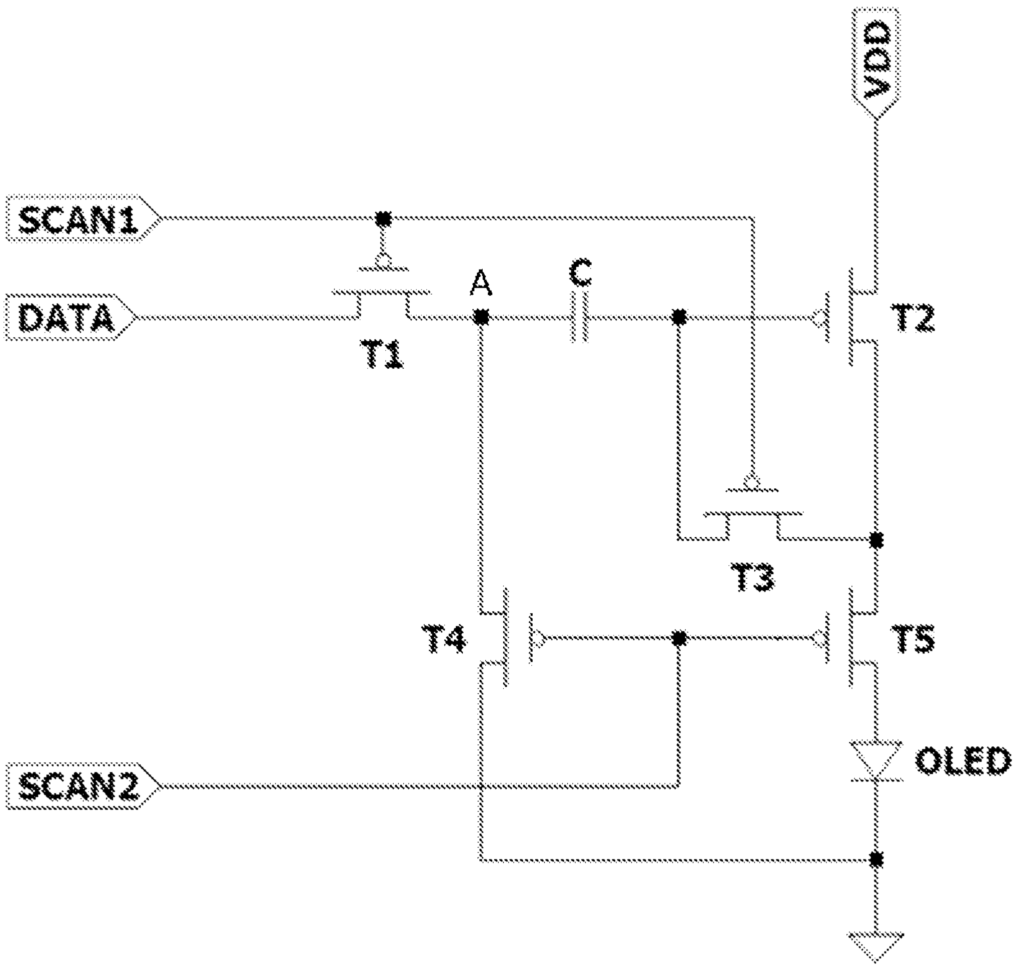
FIG. 5 is a configuration diagram of a driving circuit provided by the embodiment of the present application.

Specifically, during the second time period of each cycle, the first switching circuit 104 is turned off, since the compensation circuit receives the data voltage, and the compensation circuit starts charging the storage capacitor C, as shown in FIG. 5, the voltage $V_A$ at point A is the voltage value of the data voltage input to the compensation circuit, i.e., $V_A=V_{data}$. The G pole and D pole of the drive-type transistor T2 are short-connected to form a diode connection structure, and the G pole voltage of the drive-type transistor T2 may be represented as: $V_G=V_{DD}-|V_{th}|$, where, $V_G$ represents the G pole voltage of the drive-type transistor T2, and $V_{DD}$ represents the voltage of the power supply. $V_{th}$ represents the threshold voltage of the drive-type transistor T2. The voltage of the stored capacitor C may be represented as $V_C=V_G-V_A=V_{DD}-|V_{th}|-V_{data}$.

During the first time period of each cycle, the first switching circuit 104 is turned on, and it can be understood as that: the circuit between the drive-type transistor T2 and the light-emitting device OLED is turned on. In the case where the compensation circuit 103 is turned off, the storage capacitor C discharges to the third pole of the drive transistor T2, and the voltage of the gate of the drive transistor T2 is the voltage V of the storage capacitor C. Therefore, the driving current output by the drive transistor T2 is related to the storage capacitor $V_C$ And the voltage $V_C$ of the storage capacitor C is the electrical energy that the compensation circuit 103 charged to the storage capacitor C utilizing the data voltage.

In one embodiment of the present application, the compensation circuit 103 is further configured to receive a first scan signal (e.g., SCAN1), and the first switching circuit 104 is configured to receive a second scan signal (e.g., SCAN2). The first scan signal SCAN1 is configured to control the on/off of the compensation circuit 103. The second scan signal SCAN2 is configured to control the on/off of the first switching circuit 104. Accordingly, the compensation circuit 103 is specifically to turn on or turn off according to the received data voltage $V_{data}$ and the state and the first scan signal SCAN1. The first switching circuit 104 is further configure to be turned on or turned off according to the second scan signal SCAN2.

As an example, when the data voltage $V_{data}$ is input and the first scan signal SCAN1 controls the compensation circuit 103 to turn on, the compensation circuit 103 is configured to charge the storage capacitor C in the compensation circuit 103 utilizing the data voltage $V_{data}$, and the second scan signal SCAN2 controls the first switching circuit 104 to turn off. The driving current of the drive-type transistor T2 does not flow to the light emitting device OLED.

When the data voltage $V_{data}$ is not input, the first scan signal SCAN1 controls the compensation circuit 103 to turn off, and the second scan signal SCAN2 controls the first switch circuit 104 to turn on, so that the drive current of the drive transistor T2 flows to the light emitting device OLED to drive the OLED to emit light.

In the embodiments of the present application, the level state of the data voltage may be utilized to reflect whether a data voltage input is present, such as if the level state of the data voltage received by the compensation circuit is high, indicating the presence of a data voltage input. If the level state of the data voltage received by the compensation circuit is low, indicating there is no data voltage input present.

In one embodiment of the present application, during the first time period of each cycle, the compensation circuit 104 does not receive the data voltage $V_{data}$, the first scan signal SCAN1 is the first level signal, the second scan signal SCAN2 is the second level signal, and the level states of the first level signal and the second level signal are opposite. During the second time period of each cycle, the first scan signal SCAN1 is the second level signal, the second scan signal SCAN2 is the first level signal, and the compensation circuit 103 receives the data voltage $V_{data}$.

In one embodiment of the present application, the compensation circuit 103 further includes: a second switching circuit for receiving the first scan signal SCAN1, when the second switching circuit is turned on, the energy storage element is configured to store the electrical energy utilizing the received data voltage $V_{data}$. In the case where the second switching circuit is turned on, the energy storage element is configured to release the electrical energy.

Figure 4:
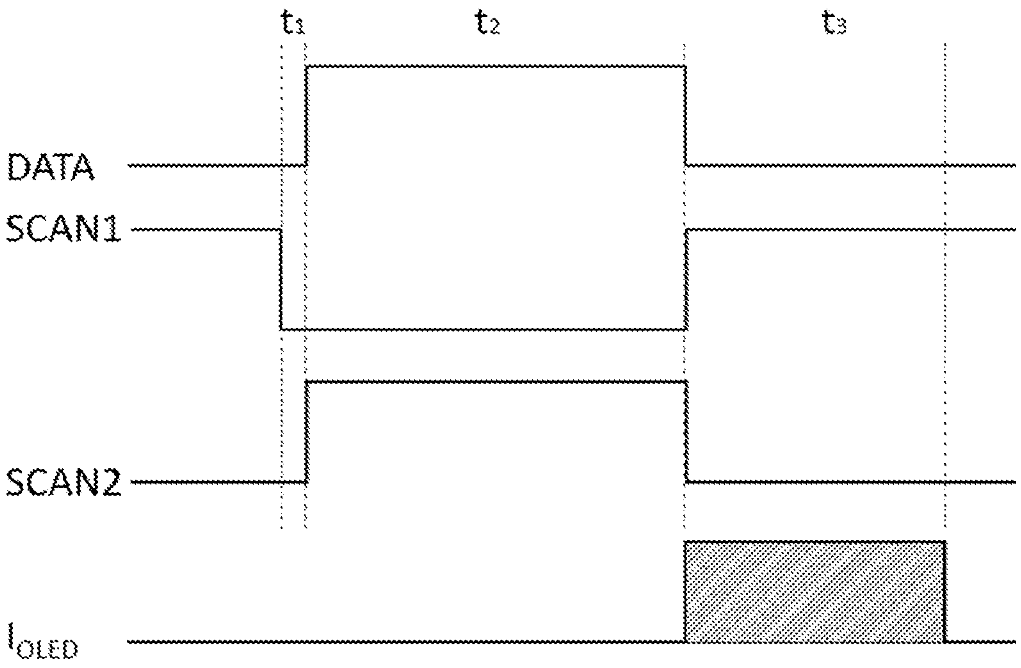
FIG. 4 is an operational timing diagram of a driving voltage compensation circuit in the driving circuit provided by the embodiment of the present application.

In one embodiment of the present application, each cycle of the operational timing may further include a reset phase, for example, as shown in FIG. 4, the t3 time period is the first time period, the t2 time period is the second time period, and the t1 time period is the reset phase. During the t1 time period, the data voltage $V_{data}$ is a low level signal, i.e., there is no data voltage input for the t1 period. Since there is no data voltage data within the t1 period of time, the second switch circuit may be turned on or turned off, which is not limited in this application. Thus, during the t1 period, the second scan signal triggering the second switch circuit to turn on is a low level signal.

During the t2 time period, the data voltage $V_{data}$ is a high level signal, indicating that there is a data voltage input, at which time, in order to store electrical energy utilizing the energy storage element, the first scan signal SCAN1 input the compensation circuit may be controlled to be a low level signal, i.e., the second switch circuit in the compensation circuit 103 is turned on. During the t2 time period, the second scan signal SCAN2 is high level, i.e., the first switch circuit 104 is turned off. During the t3 time period, the data voltage $V_{data}$ is not input, the first scan signal SCAN1 is a high level signal, i.e., the second switch circuit in the compensation circuit 103 is turned off, at which time the second scan signal SCAN2 is a low level signal, i.e., the first switch circuit 104 is turned on, and the path of the light emitting device and the driving element T2 is turned on.

In one possible implementation of the present application, the second switching circuit includes a first switching device T1 and a second switching device T3. Where the second pole of the first switching device T1 is configured to receive the data voltage $V_{data}$, the first pole of the first switching device T1 is connected to the first switching circuit 104 and the first end of the energy storage element respectively, the third pole of the first switching device T1 is connected to the first scan signal SCAN1 and the third pole of the second switching device T3, and the second end of the energy storage element is connected to the second pole of the second switching device T3 and the gate of the driving element respectively.

As an example, as shown in FIG. 5, the first switching device T1 and the second switching device T2 are P-type field-effect transistors, the first pole is the source of the P-type field-effect transistor, the second pole the drain of the P-type field-effect transistor, and the third pole the gate of P-type field-effect transistor. The source of the first switching device T1 is connected to the first end of the storage capacitor C, the second end of the storage capacitor C is connected to the drain of the second switching device T3, and the gate of the drive-type transistor T2. The data voltage $V_{data}$ is input to the drain of the first switching device T1, and the first scan signal SCAN1 controls the first switching device T1 and the second switching device T3 to turn on and turn off, and then controls the second switching circuit to turn on and turn off.

In one embodiment of the present application, the first switching circuit 104 includes: a third switching device T4 and a fourth switching device T5, where, the second pole of the third switching device T4 is connected to the compensation circuit 103, the third pole of the third switching device T4 is connected to the third pole of the fourth switching device T5 and the second scan signal SCAN2, the second pole of the fourth switching device T5 is connected to the compensation circuit 103 and the first pole of the driving element 102, and the first pole of the fourth switching device T5 is connected to the light emitting device 105.

In one possible implementation of the present application, the third switching device T4 and the fourth switching device T5 are P-type field-effect transistors. The drain of the third switching device is connected to the source of the first switching device T1, the gate of the third switching device T4 is connected to the gate of the fourth switching device T5, and the second scanning signal SCAN2 is received. The drain of the fourth switching device T5 is connected to the source of the drive-type transistor T2, and the source of the fourth switching device T5 is connected to the positive pole of the light emitting device OLED.

Embodiments of the present application provide a driving circuit including a driving element and a driving voltage compensation circuit as described in the embodiments above. Where the first pole of the driving element is connected to the first switching circuit, the compensation circuit is connected to the third pole of the driving element, and the second pole of the driving element is connected to the power supply; the driving element is configured to provide the drive current to the light emitting element through the first switch circuit in the event that the first switch circuit is closed.

In one embodiment of the present application, referring to FIG. 5, the driving element is drive-type transistor T2, the drain of the drive-type transistor T2 is connected to the power supply $V_{DD}$, the gate of the drive-type transistor T2 is connected to the second end of the energy storage element in the compensation circuit, and the source of the drive-type transistor T2 is connected to the first switching circuit.

In one embodiment of the present application, the driving current provided to the light emitting device by the driving circuit during the first time period is determined by the data voltage $V_{data}$, the carrier mobility μ, the channel width W and the channel length L of the drive-type transistor T2, and the first parameter. The first parameter is determined by the thickness and the material of the gate insulation layer of the drive-type transistor. The first parameter is CGI.

In one possible implementation, each duty cycle of the drive voltage compensation circuit is divided into three phases, referring to FIG. 4, t1 time period, t2 time period (i.e., compensation phase), and t3 time period (i.e., light emission phase). It is worth noting that the driving phase is the first time period in the aforementioned embodiments, and the compensation phase is the second time period in the aforementioned embodiments. As an example, referring to FIGS. 4 and 5, during the t1 period, the data voltage $V_{data}$, the first scan signal SCAN1, and the second scan signal SCAN2 are both low-level signals, at which point the no data voltage $V_{data}$ is written, but the gate of the third switching device T4 is low, in the on-state, and the voltage of the first terminal A of the storage capacitor C may be reset. In the t2 time period, the first scan signal SCAN1 remains low, the second scan signal SCAN2 and the data voltage $V_{data}$ transition to a high level, at which time the gates of the third and fourth switching devices T4 and T5 are high, i.e., the third and fourth switching devices T4 and T5 are in the off-state, and the gates of the first and second switching devices T1 and T3 are low, i.e., the first and second switching devices T1 and T3 are in the on-state. When the data voltage $V_{data}$ is charged to the storage capacitor C by the first switching device T1, the voltage at the point A is $V_A=V_{data}$, the gate and the drain of the drive-type transistor T2 are shorted to form the diode connection structure, the gate voltage $V_G$ of the drive-type transistor T2 may be expressed as:

$$V_G=V_{DD}-|V_{th}|$$

Where $V_{DD}$ is the supply voltage, $V_{th}$ is the threshold voltage.

The voltage $V_C$ of the storage capacitor C may be expressed as:

$$V_C=V_G-V_A=V_{DD}-|V_{th}|-V_{data}$$

It should be noted that the turning off of the fourth switching device T5 may cause the light emitting device OLED to operate only in the emission phase, which may increase the lifetime thereof.

During the t3 time period, the data voltage $V_{data}$ and the second scan signal SCAN2 are switched to high level, the first scan signal SCAN1 is switched to low level, the gate of the first switching device T1 and the gate of the second switching device T3 are high level, i.e., the first switching device T1 and the second switching device T3 are turned off, and the gate of the third switching device T4 and the gate of the fourth switching device T5 are low level, i.e., the third switching device T4 and the fourth switching device T5 are turned on, and the driving current flows through the light emitting device OLED to emit light.

In one embodiment of the present application, the driving current provided by the drive-type transistor T2 to the light emitting device OLED during the first time period t2 is determined by the data voltage $V_{data}$, the channel width W and the channel length L of the drive-type transistor T2. Where the drive current $I_{OLED}$ can be expressed as:

$$\begin{aligned} I_{OLED} &= 1/2\times\mu\times W/L\times C_{GI}\times(V_{SG}-|V_{th}|)^2 \\ &= 1/2\times\mu\times W/L\times C_{GI}\times(V_{DD}-(V_{DD}-|V_{th}|-V_{data})-|V_{th}|)^2 \\ &= 1/2\times\mu\times W/L\times C_{GI}\times(V_{data})^2 \end{aligned}$$

Where $V_{SG}$ is the difference between the voltage at the source and the voltage at the gate of the drive-type transistor T2, μ is the carrier mobility, CGI is the gate capacitance, and is determined by the gate insulation layer thickness and material. It can be derived from the expression that the driving current $I_{OLED}$ is only related to the data voltage $V_{data}$, which is a variable value, and the remaining parameters are fixed parameters independent from the power supply voltage $V_{DD}$ and the threshold voltage $V_{th}$.

Embodiments of the present application provide a pixel driving circuit including a data line and a plurality of scanning lines, the data line is configured to provide a data voltage to the pixel driving circuit and the plurality of scanning lines are configured to control the pixel driving circuit.

In one embodiment of the present application, the pixel driving circuit is shown in FIG. 5, the data line is configured to provide a data voltage $V_{data}$, the plurality of scanning lines includes a first scan signal line and a second scan signal line for providing a first scan signal SCAN1 and a second scan signal SCAN2 for controlling a switching device in the pixel driving circuit to turn on and turn off.

Embodiments of the present application provide a display device including the pixel driving circuit mentioned above, and further including a display panel including a common electrode, and a light emitting device. The display device is composed of a plurality of pixel driving circuits and light emitting devices, and the plurality of pixel driving circuits drive the light emitting devices to emit light.

In the aforesaid embodiments, the descriptions of each of the embodiments are emphasized respectively, regarding the part of one embodiment which isn't described or disclosed in detail, reference may be made to relevant descriptions in some other embodiments.

The person of ordinary skill in the art may be aware of that, the elements and algorithm steps of each of the examples described in connection with the embodiments disclosed herein may be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present application.

The above-mentioned embodiments of the present application are merely used to describe rather than limit the technical solutions of the present application. Although the present application is described in detail according to the above-mentioned embodiments of the present application, those skilled in the art should understand that the technical solutions recited in respective above-mentioned embodiments of the present application can be modified or parts of technical features in the technical solutions can be substituted by technically equivalent elements. The modifications or substitutions without departing from the spirit and the scope of the technical solutions of the embodiments of the present application all fall within the scope of protection of the present application.

What is claimed is:

1. A driving voltage compensation circuit, comprising: a compensation circuit and a first switching circuit, wherein the first switching circuit is connected to a first pole of a driving element and a light emitting device, the compensation circuit is connected to a third pole of the driving element, a second pole of the driving element is connected to a power supply, the first switching circuit and the light emitting device are grounded;

the driving voltage compensation circuit operates in accordance with an operational timing comprising a plurality of cycles, each of the plurality of cycles comprises at least a first time period and a second time period; during the first time period of each of the plurality of cycles, the first switching circuit is turned on, and the compensation circuit is turned off; during the second time period of each of the plurality of cycles, the first switching circuit is turned off, and the compensation circuit is turned on; the first time period is a time period during which the light emitting device is driven to emit light, and the second time period is a time period during which a data voltage is received;

in the case where the compensation circuit is turned on, one end of an energy storage circuit of the compensation circuit receives the data voltage, the other end of the energy storage element of the compensation circuit is connected to the power supply through the driving element, the energy storage element has a voltage difference, and the compensation circuit is configured to store electrical energy for the energy storage element utilizing the received data voltage;

in the case where the compensation circuit is turned off, the energy storage element is configured to release the electrical energy to provide the driving voltage to the third pole of the driving element, the driving voltage is determined by a voltage value of the power supply, a value of a threshold voltage of the driving element, and a value of the data voltage;

wherein the energy storage element stores the electrical energy prior to the first time period of each cycle, and release the stored electrical energy to provide the driving voltage to the driving element in the first time period;

the compensation circuit is further configured to receive a first scan signal, the first switching circuit is configured to receive a second scan signal;

the first scan signal is configured to control the on/off of the compensation circuit, when the first scan signal controls the compensation circuit to turn on and the data voltage is input to the compensation circuit, the energy storage element is configured to store electrical energy; and the second scan signal is configured to control the on/off of the first switching circuit.

2. The driving voltage compensation circuit of claim 1, wherein during the first time period of each of the plurality of cycles, the compensation circuit does not receive the data voltage, the first scan signal is a first level signal, the second scan signal is a second level signal, and level states of the first level signal and the second level signal are opposite; and during the second time period of each of the cycles, the first scan signal is the second level signal, the second scan signal is the first level signal, and the compensation circuit receives the data voltage.

3. The driving voltage compensation circuit of claim 1, wherein the compensation circuit further comprises a second switching circuit for receiving the first scan signal, one end of the second switching circuit is configured to receive the data voltage, the other end of the second switching circuit is connected to one end of the energy storage element, in the case where the second switching circuit is opened, the energy storage element is configured to store the electrical energy utilizing the received data voltage; and in the case where the second switching circuit is turned off, the energy storage element is configured to release the electrical energy.

4. The driving voltage compensation circuit of claim 3, wherein the second switching circuit comprises a plurality of switching devices, and the plurality of switching devices comprise a first switching device and a second switching device;

wherein a second pole of the first switching device is configured to receive the data voltage, and a first pole of the first switching device is respectively connected to the first switching circuit and a first end of the energy storage element; and a third pole of the first switching device is connected to the first scanning signal and a third pole of the second switching device, and a second end of the energy storage element is respectively connected to a second pole of the second switching device and a third pole of the driving element.

5. The driving voltage compensation circuit of claim 4, wherein the switching device is a P-type field-effect transistor.

6. The driving voltage compensation circuit of claim 1, wherein the first switching circuit comprises a plurality of switching devices, and the plurality of switching devices comprise a third switching device and a fourth switching device;

wherein a second pole of the third switching device is connected to the compensation circuit, a third pole of the third switching device is connected to a third pole of the fourth switching device and the second scan signal, a second pole of the fourth switching device is connected to the compensation circuit and a first pole of the driving element, a first pole of the fourth switching device is connected to the light emitting device.

7. A pixel driving circuit comprising: a data line and a plurality of scanning lines, and a driving circuit, the data line is configured to provide the data voltage to the pixel driving circuit, and the plurality of scanning lines are configured to control the pixel driving circuit;

the driving circuit comprises a driving element and a driving voltage compensation circuit;

the driving voltage compensation circuit comprises a compensation circuit and a first switching circuit;

wherein the first switching circuit is connected to a first pole of a driving element and a light emitting device, the compensation circuit is connected to a third pole of the driving element, a second pole of the driving element is connected to a power supply, the first switching circuit and the light emitting device are grounded;

the driving voltage compensation circuit operates in accordance with an operational timing comprising a plurality of cycles, each of the plurality of cycles comprises at least a first time period and a second time period; during the first time period of each of the plurality of cycles, the first switching circuit is turned on, and the compensation circuit is turned off; during the second time period of each of the plurality of cycles, the first switching circuit is turned off, and the compensation circuit is turned on; the first time period is a time period during which the light emitting device is driven to emit light, and the second time period is a time period during which a data voltage is received;

in the case where the compensation circuit is turned on, one end of an energy storage circuit of the compensation circuit receives the data voltage, the other end of the energy storage element of the compensation circuit is connected to the power supply through the driving element, the energy storage element has a voltage difference, the compensation circuit is configured to store electrical energy for the energy storage element utilizing the received data voltage;

in the case where the compensation circuit is turned off, the energy storage element is configured to release the electrical energy to provide the driving voltage to the third pole of the driving element, the driving voltage is determined by a voltage value of the power supply, a value of a threshold voltage of the driving element, and a value of the data voltage;

wherein the energy storage element stores the electrical energy prior to the first time period of each cycle, and release the stored electrical energy to provide the driving voltage to the driving element in the first time period;

wherein the compensation circuit is further configured to receive a first scan signal, the first switching circuit is configured to receive a second scan signal;

the first scan signal is configured to control the on/off of the compensation circuit, when the first scan signal controls the compensation circuit to turn on and the data voltage is input to the compensation circuit, the energy storage element is configured to store electrical energy; and the second scan signal is configured to control the on/off of the first switching circuit.

8. The pixel driving circuit of claim 7, wherein during the first time period of each of the plurality of cycles, the compensation circuit does not receive the data voltage, the first scan signal is a first level signal, the second scan signal is a second level signal, and level states of the first level signal and the second level signal are opposite; and during the second time period of each of the cycles, the first scan signal is the second level signal, the second scan signal is the first level signal, and the compensation circuit receives the data voltage.

9. The pixel driving circuit of claim 7, wherein the compensation circuit further comprises a second switching circuit for receiving the first scan signal, one end of the second switching circuit is configured to receive the data voltage, the other end of the second switching circuit is connected to one end of the energy storage element, in the case where the second switching circuit is opened, the energy storage element is configured to store the electrical energy utilizing the received data voltage; and in the case where the second switching circuit is turned off, the energy storage element is configured to release the electrical energy.

10. The pixel driving circuit of claim 9, wherein the second switching circuit comprises a plurality of switching devices, and the plurality of switching devices comprise a first switching device and a second switching device;

wherein a second pole of the first switching device is configured to receive the data voltage, and a first pole of the first switching device is respectively connected to the first switching circuit and a first end of the energy storage element; and a third pole of the first switching device is connected to the first scanning signal and a third pole of the second switching device, and a second end of the energy storage element is respectively connected to a second pole of the second switching device and a third pole of the driving element.

11. The pixel driving circuit of claim 10, wherein the switching device is a P-type field-effect transistor.

12. The pixel driving circuit of claim 7, wherein the first switching circuit comprises a plurality of switching devices, and the plurality of switching devices comprise a third switching device and a fourth switching device;

wherein a second pole of the third switching device is connected to the compensation circuit, a third pole of the third switching device is connected to a third pole of the fourth switching device and the second scan signal, a second pole of the fourth switching device is connected to the compensation circuit and a first pole of the driving element, a first pole of the fourth switching device is connected to the light emitting device.

13. A display apparatus comprising a pixel driving circuit;

wherein the pixel driving circuit comprises a data line and a plurality of scanning lines, and a driving circuit, the data line is configured to provide the data voltage to the pixel driving circuit, and the plurality of scanning lines are configured to control the pixel driving circuit;

the driving circuit comprises a driving element and a driving voltage compensation circuit;

the driving voltage compensation circuit comprises a compensation circuit and a first switching circuit;

wherein the first switching circuit is connected to a first pole of a driving element and a light emitting device, the compensation circuit is connected to a third pole of the driving element, a second pole of the driving element is connected to a power supply, the first switching circuit and the light emitting device are grounded;

the driving voltage compensation circuit operates in accordance with an operational timing comprising a plurality of cycles, each of the plurality of cycles comprises at least a first time period and a second time period; during the first time period of each of the plurality of cycles, the first switching circuit is turned on, and the compensation circuit is turned off; during the second time period of each of the plurality of cycles, the first switching circuit is turned off, and the compensation circuit is turned on; the first time period is a time period during which the light emitting device is driven to emit light, and the second time period is a time period during which a data voltage is received;

in the case where the compensation circuit is turned on, one end of an energy storage circuit of the compensation circuit receives the data voltage, the other end of the energy storage element of the compensation circuit is connected to the power supply through the driving element, the energy storage element has a voltage difference, the compensation circuit is configured to store electrical energy for the energy storage element utilizing the received data voltage;

in the case where the compensation circuit is turned off, the energy storage element is configured to release the electrical energy to provide the driving voltage to the third pole of the driving element, the driving voltage is determined by a voltage value of the power supply, a value of a threshold voltage of the driving element, and a value of the data voltage;

wherein the energy storage element stores the electrical energy prior to the first time period of each cycle, and releases the stored electrical energy to provide the driving voltage to the driving element in the first time period;

wherein the compensation circuit is further configured to receive a first scan signal, the first switching circuit is configured to receive a second scan signal;

the first scan signal is configured to control the on/off of the compensation circuit, when the first scan signal controls the compensation circuit to turn on and the data voltage is input to the compensation circuit, the energy storage element is configured to store electrical energy; and the second scan signal is configured to control the on/off of the first switching circuit.

14. The display apparatus of claim 13, wherein during the first time period of each of the plurality of cycles, the compensation circuit does not receive the data voltage, the first scan signal is a first level signal, the second scan signal is a second level signal, and level states of the first level signal and the second level signal are opposite; and during the second time period of each of the cycles, the first scan signal is the second level signal, the second scan signal is the first level signal, and the compensation circuit receives the data voltage.

15. The display apparatus of claim 13, wherein the compensation circuit further comprises a second switching circuit for receiving the first scan signal, one end of the second switching circuit is configured to receive the data voltage, the other end of the second switching circuit is connected to one end of the energy storage element, in the case where the second switching circuit is opened, the energy storage element is configured to store the electrical energy utilizing the received data voltage; and in the case where the second switching circuit is turned off, the energy storage element is configured to release the electrical energy.

16. The display apparatus of claim 15, wherein the second switching circuit comprises a plurality of switching devices, and the plurality of switching devices comprise a first switching device and a second switching device;

wherein a second pole of the first switching device is configured to receive the data voltage, and a first pole of the first switching device is respectively connected to the first switching circuit and a first end of the energy storage element; and a third pole of the first switching device is connected to the first scanning signal and a third pole of the second switching device, and a second end of the energy storage element is respectively connected to a second pole of the second switching device and a third pole of the driving element.

17. The display apparatus of claim 13, wherein the first switching circuit comprises a plurality of switching devices, and the plurality of switching devices comprise a third switching device and a fourth switching device;

wherein a second pole of the third switching device is connected to the compensation circuit, a third pole of the third switching device is connected to a third pole of the fourth switching device and the second scan signal, a second pole of the fourth switching device is connected to the compensation circuit and a first pole of the driving element, a first pole of the fourth switching device is connected to the light emitting device.

* * * * *